United States Patent Office 3,310,860
Patented Mar. 28, 1967

3,310,860
PROCESS OF PRODUCING "NODULAR CHILL ROLLS"
Le Roy Frederick Gronholz, Richmond, and Daniel Kenyon Owens, Bon Air, Va., and Charles Ronald Price, Borger, Tex., assignors to E. I. du Pont de Nemours and Company, Wilmington, Del., a corporation of Delaware
No Drawing. Original application Aug. 20, 1962, Ser. No. 218,150, now Patent No. 3,177,558, dated Apr. 13, 1965. Divided and this application Aug. 12, 1964, Ser. No. 389,201
4 Claims. (Cl. 29—148.4)

This application is a divisional application of our copending application Ser. No. 218,150, filed Aug. 20, 1962, now U.S. Patent No. 3,177,558, issued Apr. 13, 1965.

This invention relates to metal articles and a process for their preparation. More particularly this invention relates to metal rolls and a process for providing them with surfaces having smooth hemi-spheroidal indentations separated by areas having a mirror finish.

In the preparation of thermoplastic polymeric films and films having thermoplastic polymeric coatings, it is the usual practice to extrude the molten polymer through a narrow die, then to quench the molten polymer to solidify the film or coating by contacting it with a cool surface. Since films are usually prepared or coated by a continuous process, the cool surface employed for quenching the molten polymer is usually the surface of a rotating drum or roll which is moving at the same lineal speed as the film. Because of the tacky nature of many thermoplastic polymeric films and coatings, it is common practice to employ quench or "chill rolls" which have an embossed or roughened surface to impart sufficient roughness to the surface of the film or coating to improve the slip and anti-blocking properties of the finished film. Sand blasted chill rolls are generally used for this purpose, since the desired degree of roughness can be easily provided by varying the particle size of the sand and the air pressure used in the blasting operation.

Although roughened "chill rolls" have been widely used to improve the surface properties of thermoplastic polymeric films and coatings, this type of roll has never been completely satisfactory, particularly in the preparation of transparent film to be used on automatic, high speed packaging machines, since all known "chill roll" surfaces having sufficient roughness to impart good slip and anti-blocking properties to films and coatings also degrade the appearance of the films and coatings by imparting a low level of gloss and a high level of haze.

It is an object of this invention to provide metal articles and a process for their preparation.

It is a further object of this invention to provide metal rolls having surfaces with smooth hemi-spheroidal indentations randomly spaced and separated by areas having a mirror finish.

A still further object of this invention is to provide roughened metal surfaces which can be used to emboss thermoplastic polymeric films and coatings to improve their surface properties without degrading their appearance. These and other objects will appear hereinafter.

These and other objects of this invention are accomplished by the process comprising polishing the surface of a metal having a Rockwell hardness of between B 85 and C 30 to reduce the roughness to no more than 2 microinches; plating the polished metal surface with a layer of chromium no more than 0.002 inch in thickness; blasting the chrome plated metal surface with a stream of fluid under pressure, said fluid containing and propelling smooth spheres of a solid of hardness greater than the hardness of said metal surface, to provide hemi-spheroidal indentations in the chrome surface separated by areas of highly polished surface having a mirror finish.

Hemi-spheroidal indentations are indentations which are essentially spherical sectors, such as are formed by the impact of a hard spherical body with the smooth surface of a softer material at an angle essentially perpendicular to the surface.

A surface having a mirror finish is a surface which reflects visible light to a sufficient degree to cause the surface to have a glossy or bright appearance. In general, a metal surface having a degree of roughness of less than about 2 microinches (R.M.S.) will have a mirror finish, while a metal surface having an appreciably greater degree of roughness will have a dull or frosty appearance.

Throughout this specification, roughness is expressed as the root-mean-square (R.M.S.) average deviation from the mean surface in microinches.

The Rockwell hardness test is discussed in "Metals Handbook," 1948 Edition, pages 93–105, published by the American Society for Metals. Many metals and alloys are capable of having a Rockwell hardness of between B 85 and C 30 through either heat treatment or by the process of manufacture; however, those composed predominately of either iron or nickel are preferred for use in this invention.

A preferred metal surface of this invention is a steel roll having a chrome plating no more than 0.002 inch thick, preferably about .00075 in. thick, the surface of which has an overall roughness of about 4 to 20 microinches (R.M.S.), preferably about 9 microinches (R.M.S.), due to the presence of about $2 \times 10^4$ to $12 \times 10^6$, preferably about $0.14 \times 10^6$, randomly spaced, hemi-spheroidal indentations per square inch of surface having diameters ranging from 50 to 1500 microinches, preferably 800 to 1300 microinches, which are separated by highly polished areas having a mirror finish. Rolls finished in this manner are quite useful as "chill rolls" in the preparation of transparent thermoplastic films having good slip, appearance and anti-blocking properties.

The preferred procedure for preparing the preferred roll consists of polishing a steel roll of about 95 Rockwell B hardness to a finish of about 1–1.5 microinches (R.M.S.); electrolytically applying a layer of bright chromium of a thickness of about .00075 inch thick; polishing the chrome plated surface to a 1 microinch (R.M.S.) finish, then blasting the polished, chrome surface through a ¼ inch nozzle with a stream of water containing glass beads of 200 to 600 microinch diameter and under a pressure of about 50 p.s.i. During the blasting treatment, which is continued until the desired overall roughness is attained, the nozzle is maintained at a distance of about 6 inches from the surface and directed perpendicular to the surface while being moved back and forth across the surface at a linear speed of about 15 ft./min.

To prepare "chill rolls" or other metal objects having the critical finish of the invention, it is necessary to provide conditions such that the shot blasting operation will provide hemi-spheroidal indentations rather than general surface abrasion. This can be accomplished only by shot blasting the surface at essentially a perpendicular angle so the shots will rebound from the surface without appreciably deforming the hemi-spheroidal indentations formed on the impact. Because of this consideration, a very small blasting nozzle should be used when shot blasting a curved surface, such as that of a "chill roll." Also, to prevent general abrasion, it is necessary that the hardness of the base metal be at least 85 Rockwell B hardness and have a bright chrome coating of no more than .002 inch thick. Because of their hardness, thicker chrome coatings make it almost impossible to provide the necessary indentations using the usual shot blasting procedure employing beads, while the absence of a chrome layer and the use of a softer base metal leads to excessive abrasion regardless of shot blasting angle.

It is also necessary that the chrome layer be highly polished and superimposed upon highly polished base metal. It appears that excess roughness and non-uniformities in the chrome thickness cause the impinging beads to rebound at an angle considerably off perpendicular, hence to abrade the surface during the shot blasting operation. If the base metal is properly polished and cleaned and only a rather thin layer of chrome is plated onto the base metal with great care, the chrome will be deposited in a very smooth layer which is suitable for shot blasting without further polishing. For some unknown reason, shots usually produce indentations of diameter considerably larger than their own diameter.

The base metal and chrome plating can be polished using any conventional polishing techniques such as chromium oxide cloth belt, electrolytic polishing and the like.

It has been observed that during the shot blasting treatment using glass beads, a small percentage of the beads may brake if they are propelled by water under a pressure above about 75 p.s.i. However, only an insignificant amount of objectionable abrasion will result from the broken bead particles providing the beads are not recycled during blasting procedure. If desired, the beads can be reused, but only after the broken ones have been removed by some suitable means, for example, by flotation. While glass beads are preferred, any type of spherical shot can be used which has a hardness greater than the base metal.

"Chill rolls" having their surfaces finished as just described have a bright overall appearance even though the hemi-spheriodal indentations are visible to the naked eye upon close examination. Microscopic examination reveals that the indentations are smooth, randomly spaced and make up to about 16% of the total surface area, while the remaining area is quite smooth and highly light reflecting.

When such rolls are used in the preparation of thermoplastic polymeric films, the replica of the roll surface is generally molded onto the surface of the films, thus, imparting sufficient roughness to give good slip and anti-blocking properties to the film. However, because of the particular nature of the roughness, the films also have good gloss and a low level of haze, contrary to the usual case. It is believed that the rather large amount of smooth surface area gives a high gloss level to the film, while the nodules imparted by the roll indentations provide good anti-blocking and slip properties by reducing the contact area of the film surface. Apparently, because of their smooth, hemi-spheroidal shape, the nodules diffract only an insignificant amount of light striking the film, hence, do not impair the transparency of the film or impart noticeable haze.

The highly beneficial nature of the "chill roll" finish provided by this invention becomes more evident when it is compared directly with the finish of sand blasted "chill rolls" generally employed previously. The surface of a sand blasted roll, having sufficient roughness to impart good surface properties to film, has a dull, frosty overall appearance. On viewing such a sand blasted surface perpendicular to the surface through a microscope, it is found that the majority of the surface is covered with minute irregular pits and scratches which give the surface an abraded appearance. When examined under a miscroscope at a low angle, the irregularities of a sand blasted surface are observed to have sharp and jagged edges. It is quite understandable, therefore, that films perpared using a sand blasted "chill roll" have poor appearance and transparency.

To prepare transparent thermoplastic polymeric films and coatings having both satisfactory surface properties and good appearance, it is necessary that the "chill roll" used in preparing the film have a surface finished according to the preferred process of this invention. The use of a "chill roll" having an overall roughness of less than about 4 microinches (R.M.S.) will yield film of good appearance but poor slip and anti-blocking properties. Similar results are obtained if the "chill roll" surface has indentations less than about 50 microinches in diameter or are present in concentration less than about $2 \times 10^4$ per square inch. On the other hand, the use of a "chill roll" having either an overall roughness of greater than about 20 microinches, indentations of greater concentration than about $12 \times 10^6$ per square inch, an average indentation greater than about 1500 microinches in diameter, or indentations separated by areas not having a mirror finish will yield thermoplastic films and coatings having good slip and anti-blocking properties, but poor appearance. Likewise, the use of a "chill roll" having indentations which are irregular and non-spheroidal in configuration will yield hazy film, since the nodules molded onto the surface of the film will diffuse a large portion of light striking the film.

*Example*

The surface of a roll 6 inches in diameter and 64 inches long of type ASI 4320 steel of 95 Rockwell B hardness was polished with a chrome oxide cloth belt until the roughness was reduced to 1–1.5 microinches (R.M.S.). The roll was then plated for 1 hour in a chromic acid-sulfuric acid plating bath to apply a .00075 inch layer of bright chromium, which after washing and drying, was polished with a chrome oxide belt to a 1–1.5 microinches (R.M.S.) finish. Subsequently, the roll was seated into a mount, and rotated at ⅓ revolution per minute while being blasted with a stream of water containing 1 lb./gal. of glass beads 200 to 600 microinch in diameter and under a pressure of 50 p.s.i. A ¼ inch nozzle, which was held 6 inches away and pointed perpendicular to the rotating roll while being moved back and forth across the length of the roll at a linear speed of about 15 ft./min., was used in the blasting operation that was continued until the roll had an overall roughness of 7 microinches (R.M.S.) The finished roll had a bright finish; although, upon close examination with the unaided eye, the hemi-spheroidal indentations formed during the blasting operation were visible. From photomicrographs taken of the roll surface, it was found that these were $0.14 \times 10^6$ indentations per square inch of surface area ranging from 800 to 1300 microinches in diameter.

This roll was used as a "chill roll" in the coating of regenerated cellulose film with polyethylene resin by the process disclosed in Canadian Patent 545,282 to yield coated film having high gloss, good transparency and excellent slip and good anti-blocking characteristics.

Although the indented roll of this invention is particularly useful for the polyethylene coating of cellophane, it should be understood that the roll can have more general applications. One such application would include lowering the coefficient of surface friction of any self-supporting thermoplastic film. It is readily apparent that for each application the actual surface finish may vary. As has already been indicated, "chill rolls" having the preferred finish are required in the preparation of transparent films having good appearance, anti-blocking properties and sufficient slip to be suitable for use on high speed wrapping and packaging machines; however, "chill rolls" or other metal coating surface having a finish of this invention outside of the preferred range can be employed with satisfactory results in the preparation of opaque film or in the preparation of non-blocking film to be used in manual packaging operations in which a high degree of slip is not required.

What is claimed is:

1. The process comprising: polishing the surface of a metal having a Rockwell hardness of between B85 and C30 to reduce the roughness to no more than 2 microinches; plating the polished metal surface with a layer of chromium no more than 0.002 inch in thickness; providing $2 \times 10^4$ to $12 \times 10^6$ hemi-spheroidal indentations per square inch in the chrome surface separated by areas of highly polished surface having a mirror finish by blasting the chrome plated metal surface with a stream of fluid under pressure, said fluid containing, and propelling against said metal surface, smooth spheres of a solid of hardness greater than the hardness of said metal surface.

2. The process comprising: polishing the surface of a metal having a Rockwell hardness of between B85 and C30 to reduce the roughness to no more than 2 microinches; plating the polished metal surface with a layer of chromium no more than 0.002 inch in thickness; blasting the chrome plated metal surface with a stream of fluid under pressure, said fluid containing, and propelling against said metal surface, smooth spheres of a solid of hardness greater than the hardness of said metal surface, to impart an overall roughness of 4 to 20 microinches due to the presence of $2 \times 10^4$ to $12 \times 10^6$ hemi-spheroidal indentations per square inch of surface, having diameters in the range of 50 to 1500 microinches.

3. The process comprising: polishing the surface of a steel roll having a Rockwell B hardness of about 95 to a finish of about 1 to 1.5 microinches; electrolytically plating the polished steel roll with a layer of chromium of a thickness of about 0.00075 inch; polishing the chromium plated surface to a finish of about 1 microinch and blasting the polished chromium surface with a stream of water containing glass beads having a diameter within the range of 200 to 600 microinches at a pressure of about 50 p.s.i. until the surface has an overall roughness of about 9 microinches due to the presence of about $0.14 \times 10^6$ hemi-spheroidal indentations per square inch of surface having diameters ranging from about 800 to 1300 microinches.

4. The process of claim 3 wherein the stream of water is directed perpendicular to the surface while traversing the surface at a linear speed of about 15 feet per minute.

References Cited by the Examiner

UNITED STATES PATENTS

| | | | |
|---|---|---|---|
| 2,863,175 | 12/1958 | Meyer | 29—121 |
| 2,932,859 | 4/1960 | Rockoff | 29—121 |
| 3,245,897 | 4/1966 | Lane | 29—121 |

JOHN F. CAMPBELL, *Primary Examiner.*

P. M. COHEN, *Assistant Examiner.*